(12) United States Patent
Calderon et al.

(10) Patent No.: US 12,025,371 B2
(45) Date of Patent: *Jul. 2, 2024

(54) SOLVENT INJECTION AND RECOVERY IN A LNG PLANT

(71) Applicant: CONOCOPHILLIPS COMPANY, Houston, TX (US)

(72) Inventors: Michael J. Calderon, Houston, TX (US); Dale L. Embry, Houston, TX (US); Paul R. Davies, Houston, TX (US); Attilio J. Praderio, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/136,540

(22) Filed: Apr. 19, 2023

(65) Prior Publication Data

US 2023/0251032 A1 Aug. 10, 2023

Related U.S. Application Data

(63) Continuation of application No. 16/861,811, filed on Apr. 29, 2020, now Pat. No. 11,662,141.

(Continued)

(51) Int. Cl.
*F25J 3/00* (2006.01)
*B01D 53/14* (2006.01)
*F25J 3/02* (2006.01)

(52) U.S. Cl.
CPC ........ *F25J 3/0295* (2013.01); *B01D 53/1425* (2013.01); *B01D 53/1431* (2013.01);

(Continued)

(58) Field of Classification Search
CPC .................... B01D 53/1437; B01D 53/18; B01D 53/1493; B01D 53/1431; B01D 53/1406;

(Continued)

(56) References Cited

U.S. PATENT DOCUMENTS 3,977,203 A 8/1976 Hinton et al.
4,617,038 A 10/1986 Mehra (Continued)

FOREIGN PATENT DOCUMENTS

CA 2841624 C 9/2019
WO WO-2015138846 A1 9/2015

OTHER PUBLICATIONS

Extended European Search Report for Application No. 20798964.1 dated Dec. 7, 2022 (9 pages).

(Continued)

*Primary Examiner* — Brian M King
(74) *Attorney, Agent, or Firm* — Polsinelli PC

(57) ABSTRACT

Implementations described and claimed herein provide systems and methods for processing liquefied natural gas (LNG). In one implementation, a solvent is injected into a feed of natural gas at a solvent injection point. A mixed feed is produced from a dispersal of the solvent into the feed of natural gas. The mixed feed contains heavy components. A chilled feed is produced by chilling the mixed feed. The chilled feed includes a vapor and a condensed liquid. The condensed liquid contains a fouling portion of the heavy components condensed by the solvent during chilling. The liquid containing the fouling portion of the heavy components is separated from the vapor. The vapor is directed into a feed chiller heat exchanger following separation of the liquid containing the fouling portion of the heavy components from the vapor, such that the vapor being directed into feed chiller heat exchanger is free of freezing components.

18 Claims, 9 Drawing Sheets

Related U.S. Application Data

(60) Provisional application No. 62/840,180, filed on Apr. 29, 2019.

(52) U.S. Cl.
CPC .......... *F25J 3/0209* (2013.01); *F25J 3/0247* (2013.01); *F25J 2200/10* (2013.01); *F25J 2210/04* (2013.01); *F25J 2220/64* (2013.01)

(58) Field of Classification Search
CPC .... B01D 2252/2056; B01D 2252/2025; C10L 3/104; F25J 3/0295
See application file for complete search history.

(56) References Cited

U.S. PATENT DOCUMENTS

| | | |
|---|---|---|
| 5,462,583 A | 10/1995 | Wood |
| 5,642,630 A | 7/1997 | Abdelmalek |
| 5,718,126 A | 2/1998 | Capron et al. |
| 10,130,897 B2 | 11/2018 | Grave et al. |
| 2005/0284176 A1 | 12/2005 | Eaton et al. |
| 2009/0151391 A1* | 6/2009 | Huang .................. F25J 1/0022 62/620 |
| 2015/0166915 A1 | 6/2015 | Mak |
| 2016/0245587 A1 | 8/2016 | Shah |
| 2018/0066889 A1* | 3/2018 | Gaskin .................. F25J 3/0209 |
| 2018/0266757 A1* | 9/2018 | Embry .................. F25J 3/0214 |

OTHER PUBLICATIONS

International Search Report and Written Opinion for International Application No. PCT/US2020/030448, dated Aug. 12, 2020, 8 pages.

* cited by examiner

SOLVENT INJECTION AND RECOVERY IN A LNG PLANT

CROSS-REFERENCE TO RELATED APPLICATIONS

The present application is a continuation of and claims priority to U.S. Non-Provisional application Ser. No. 16/861,811 filed Apr. 29, 2020, and entitled "Solvent Injection and Recovery in a LNG PLant," which claims priority to U.S. Provisional Patent Application No. 62/840,180, entitled "Solvent Injection and Recovery in a LNG Plant" and filed on Apr. 29, 2019. Each of these applications is specifically incorporated by reference in its entirety herein.

BACKGROUND

I. Technical Field

Aspects of the present disclosure relate generally to systems and methods for liquefaction of natural gas and more particularly to elimination of freezing during processing of liquefied natural gas (LNG) through solvent injection.

II. State of the Art

Natural gas is a commonly used resource comprised of a mixture of naturally occurring hydrocarbon gases typically found in deep underground natural rock formations or other hydrocarbon reservoirs. More particularly, natural gas is primarily comprised of methane and often includes other components, such as, ethane, propane, carbon dioxide, nitrogen, hydrogen sulfide, and/or the like.

Cryogenic liquefaction generally converts the natural gas into a convenient form for transportation and storage. More particularly, under standard atmospheric conditions, natural gas exists in vapor phase and is subjected to certain thermodynamic processes to produce LNG. Liquefying natural gas greatly reduces its specific volume, such that large quantities of natural gas can be economically transported and stored in liquefied form.

Some of the thermodynamic processes generally utilized to produce LNG involve cooling the natural gas to near atmospheric vapor pressure. For example, a natural gas stream may be sequentially passed at an elevated pressure through multiple cooling stages that cool the gas to successively lower temperatures until the liquefaction temperature is reached. Stated differently, the natural gas stream is cooled through indirect heat exchange with one or more refrigerants, such as propane, propylene, ethane, ethylene, methane, nitrogen, carbon dioxide, and/or the like, and expanded to near atmospheric pressure.

During cooling of the processed natural gas stream, trace amounts of intermediate components, such as propanes, butanes, and pentanes, and heavy hydrocarbon components ("heavies"), such as C12 to C16 hydrocarbons, often freeze in downstream systems of in an LNG plant, including heat exchangers. As these components freeze during the cooling process, deposits buildup on internal surfaces of various systems of the LNG plant. Such fouling may result in a shutdown of one or more systems of the LNG plant to remove the deposits, resulting in a loss of production. For example, conventional LNG plants may experience an increase in pressure drop in a chilling area of the LNG train, such as a heat exchanger. The pressure drop may increase beyond system constraints unless train throughput is curtailed and eventually shutdown to de-rim the heat exchanger to remove deposits. Conventionally, the cycle of pressure drop increase, feed curtailment, shutdown, and de-riming of the heat exchanger continues as a result of fouling.

It is with these observations in mind, among others, that various aspects of the present disclosure were conceived and developed.

SUMMARY

Implementations described and claimed herein address the foregoing problems by providing systems and methods for processing liquefied natural gas (LNG). In one implementation, a solvent is injected into a feed of natural gas at a solvent injection point. A mixed feed is produced from a dispersal of the solvent into the feed of natural gas. The mixed feed contains heavy components. A chilled feed is produced by chilling the mixed feed. The chilled feed includes a vapor and a condensed liquid. The condensed liquid contains a fouling portion of the heavy components condensed by the solvent during chilling. The liquid containing the fouling portion of the heavy components is separated from the vapor. The vapor is directed into a feed chiller heat exchanger following separation of the liquid containing the fouling portion of the heavy components from the vapor, such that the vapor being directed into feed chiller heat exchanger is free of freezing components.

In another implementation, a solvent is injected into a feed of natural gas at a solvent injection point. A condensed liquid is formed by condensing a fouling portion of the feed of natural gas using the solvent. The condensed liquid is separated from a vapor of the feed of natural gas, and the vapor is free of fouling components. The vapor is directed to a feed chiller heat exchanger, and the condensed liquid is directed to a solvent recovery unit. A recovered solvent is produced from the condensed liquid using the solvent recovery unit.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

BRIEF DESCRIPTION OF THE DRAWINGS

The foregoing summary, as well as the following detailed description, will be better understood when read in conjunction with the appended drawing. For the purpose of illustration, there is shown in the drawing certain embodiments of the present inventive concept. It should be understood, however, that the present inventive concept is not limited to the precise embodiments and features shown. The accompanying drawing, which is incorporated in and constitutes a part of this specification, illustrates an implementation of apparatuses consistent with the present inventive concept and, together with the description, serves to explain advantages and principles consistent with the present inventive concept, in which.

DETAILED DESCRIPTION

Figure 1:
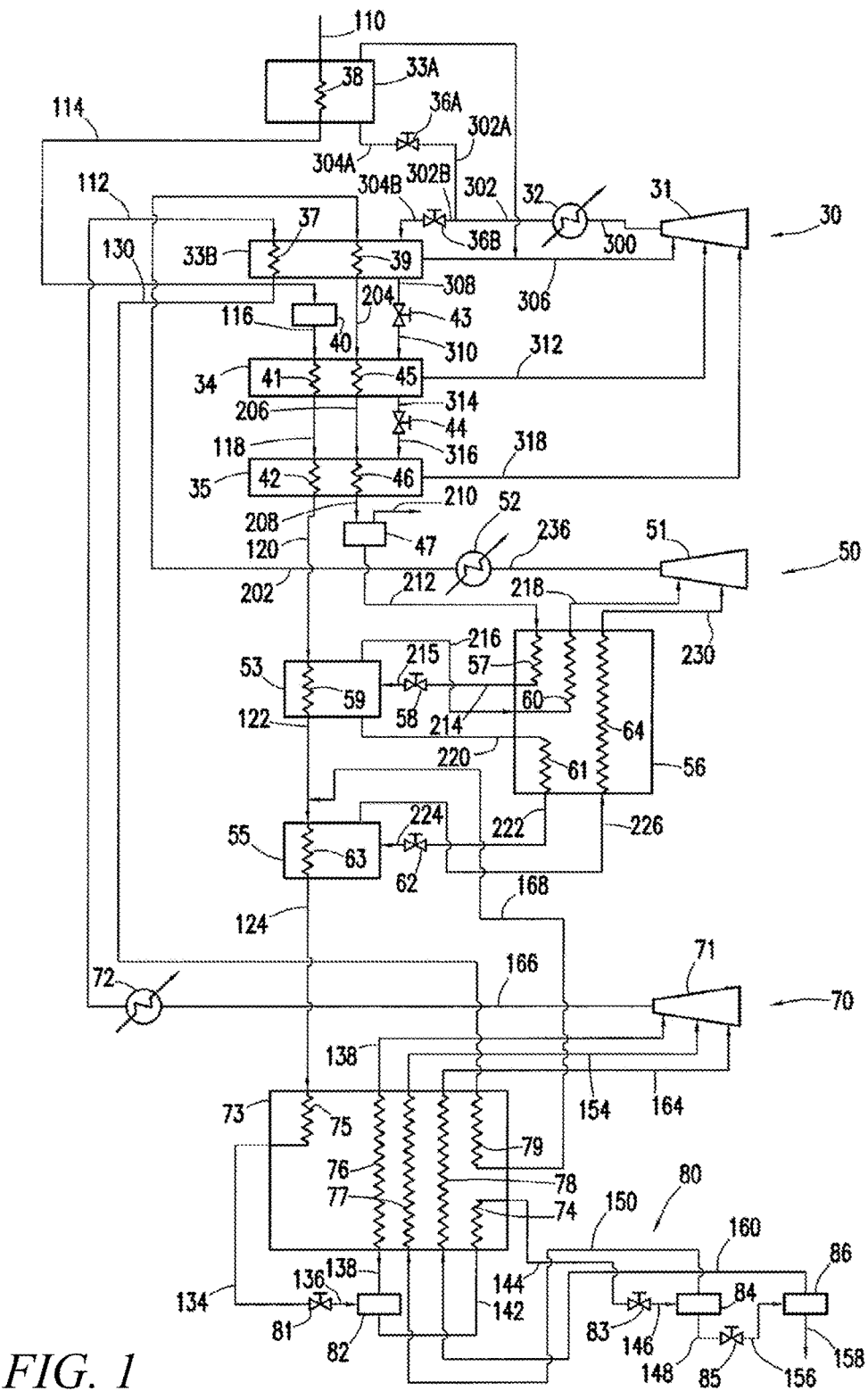
FIG. 1 illustrates an example simplified flow diagram of a cascade refrigeration process with a solvent injection for LNG production.

Aspects of the present disclosure involve systems and methods for solvent injection for LNG production. In one aspect, freezing during processing of liquefied natural gas (LNG) is eliminated or significantly reduced through solvent injection, which forces freezing components of the gas phase of LNG production into a liquid that may be separated before entering chilling and liquefaction. A solvent recovery unit (SRU) is disposed between debutanizers and condensate tanks of the LNG train to minimize a quantity of imported solvent. The SRU includes a plurality of towers with one or more pumps, reflux drums, condensers, reboilers, and/or the like. An internal recovered solvent is injected into pipeline gas, thereby changing a composition of the pipeline gas, such that separation of freezing components from the feed is thermodynamically feasible. The SRU processes rich solvent containing the freezing components to dispose of the freezing components, and a lean solvent that is clean of the freezing components is recycled back into the feed. The presently disclosed technology thus: reliably eliminates freezing in chilling and liquefaction areas of the LNG train; provides a customizable solvent with a rate and composition that may be adjustable according to different feed compositions; and provides a customizable system that may deployable into various LNG train architectures, among other advantages that will be apparent from the present disclosure.

I. Terminology

The liquefaction process described herein may incorporate one or more of several types of cooling systems and methods including, but not limited to, indirect heat exchange, vaporization, and/or expansion or pressure reduction.

Indirect heat exchange, as used herein, refers to a process involving a cooler stream cooling a substance without actual physical contact between the cooler stream and the substance to be cooled. Specific examples of indirect heat exchange include, but are not limited to, heat exchange undergone in a shell-and-tube heat exchanger, a core-in-shell heat exchanger, and a brazed aluminum plate-fin heat exchanger. The specific physical state of the refrigerant and substance to be cooled can vary depending on demands of the refrigeration system and type of heat exchanger chosen.

Expansion or pressure reduction cooling refers to cooling which occurs when the pressure of a gas, liquid or a two-phase system is decreased by passing through a pressure reduction means. In some implementations, expansion means may be a Joule-Thomson expansion valve. In other implementations, the expansion means may be either a hydraulic or gas expander. Because expanders recover work energy from the expansion process, lower process stream temperatures are possible upon expansion.

In the description, phraseology and terminology are employed for the purpose of description and should not be regarded as limiting. For example, the use of a singular term, such as "a", is not intended as limiting of the number of items. Also, the use of relational terms such as, but not limited to, "down" and "up" or "downstream" and "upstream", are used in the description for clarity in specific reference to the figure and are not intended to limit the scope of the present inventive concept or the appended claims. Further, any one of the features of the present inventive concept may be used separately or in combination with any other feature. For example, references to the term "implementation" means that the feature or features being referred to are included in at least one aspect of the present inventive concept. Separate references to the term "implementation" in this description do not necessarily refer to the same implementation and are also not mutually exclusive unless so stated and/or except as will be readily apparent to those skilled in the art from the description. For example, a feature, structure, process, step, action, or the like described in one implementation may also be included in other implementations, but is not necessarily included. Thus, the present inventive concept may include a variety of combinations and/or integrations of the implementations described herein. Additionally, all aspects of the present inventive concept as described herein are not essential for its practice.

Lastly, the terms "or" and "and/or" as used herein are to be interpreted as inclusive or meaning any one or any combination. Therefore, "A, B or C" or "A, B and/or C" mean any of the following: "A"; "B"; "C"; "A and B"; "A and C"; "B and C"; or "A, B and C." An exception to this definition will occur only when a combination of elements, functions, steps or acts are in some way inherently mutually exclusive.

II. General Architecture and Operations

Some LNG projects introduce pipelines as a source of feed gas in an LNG Optimized Cascade Process (OCP). The Optimized Cascade Process is based on three multi-staged, cascading refrigerants circuits using pure refrigerants, brazed aluminum heat exchangers and insulated cold box modules. Pure refrigerants of propane (or propylene), ethylene, and methane may be utilized.

The Optimized Cascade Process may use a heavies removal distillation column (heavies removal unit or HRU) to eliminate C6+ hydrocarbons (i.e. heavy components) from the natural gas prior to condensing the gas to LNG. In the usual case, the gas has already been amine treated and dehydrated prior to heavies removal. Heavies removal is done to prevent freezing from occurring in the liquefaction heat exchangers and to moderate the heating value of the LNG. It also prevents LNG from being outside specification limits due to increased levels of heavy components.

The presently disclosed technology may be implemented in a cascade LNG system employing a cascade-type refrigeration process using one or more predominately pure component refrigerants. The refrigerants utilized in cascade-type refrigeration processes can have successively lower boiling points to facilitate heat removal from the natural gas stream that is being liquefied. Additionally, cascade-type refrigeration processes can include some level of heat integration. For example, a cascade-type refrigeration process can cool one or more refrigerants having a higher volatility through indirect heat exchange with one or more refrigerants having a lower volatility. In addition to cooling the natural gas stream through indirect heat exchange with one or more refrigerants, cascade and mixed-refrigerant LNG systems can employ one or more expansion cooling stages to simultaneously cool the LNG while reducing its pressure.

In one implementation, the LNG process may employ a cascade-type refrigeration process that uses a plurality of multi-stage cooling cycles, each employing a different refrigerant composition, to sequentially cool the natural gas stream to lower and lower temperatures. For example, a first refrigerant may be used to cool a first refrigeration cycle. A second refrigerant may be used to cool a second refrigeration cycle. A third refrigerant may be used to cool a third refrigeration cycle. Each refrigeration cycle may include a closed cycle or an open cycle. The terms "first", "second", and "third" refer to the relative position of a refrigeration cycle. For example, the first refrigeration cycle is positioned just upstream of the second refrigeration cycle while the second refrigeration cycle is positioned upstream of the third refrigeration cycle and so forth. While at least one reference to a cascade LNG process comprising three different refrigerants in three separate refrigeration cycles is made, this is not intended to be limiting. It is recognized that a cascade LNG process involving any number of refrigerants and/or refrigeration cycles may be compatible with one or more implementations of the presently disclosed technology. Other variations to the cascade LNG process are also contemplated. It will also be appreciated that the presently disclosed technology may be utilized in non-cascade LNG processes. One example of a non-cascade LNG process involves a mixed refrigerant LNG process that employs a combination of two or more refrigerants to cool the natural gas stream in at least one cooling cycle.

Figure 2:
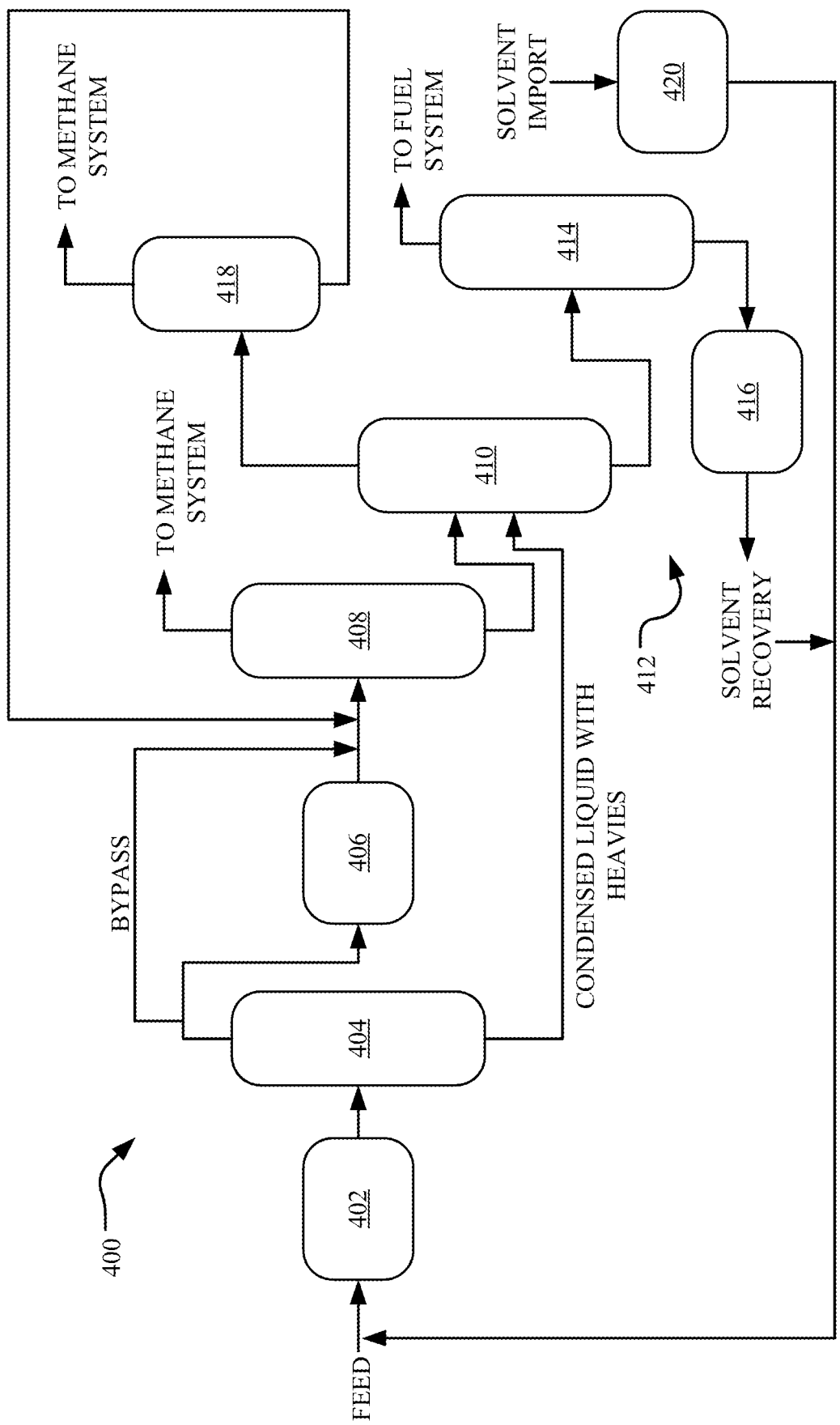
FIG. 2 shows an example LNG production system with dry gas solvent injection.

To begin a detailed description of an example cascade LNG facility 100 in accordance with the implementations described herein, reference is made to FIG. 1. The LNG facility 100 generally comprises a first refrigeration cycle 30 (e.g., a propane refrigeration cycle), aa second refrigeration cycle 50 (e.g., an ethylene refrigeration cycle), and a third refrigeration cycle 70 (e.g., a methane refrigeration cycle) with an expansion section 80. FIG. 2 illustrates shows an example LNG production system 400 with dry gas solvent injection that may be integrated with an LNG producing facility, such as the LNG facility 100. Other implementations of example LNG production systems are illustrated in FIGS. 5-9 and may be similarly integrated with an LNG producing facility, such as the LNG facility 100. Those skilled in the art will recognize that FIGS. 1-2 and 5-9 are schematics only and, therefore, various equipment, apparatuses, or systems that would be needed in a commercial plant for successful operation have been omitted for clarity. Such components might include, for example, compressor controls, flow and level measurements and corresponding controllers, temperature and pressure controls, pumps, motors, filters, additional heat exchangers, valves, and/or the like. Those skilled in the art will recognize such components and how they are integrated into the systems and methods disclosed herein.

In one implementation, the main components of propane refrigeration cycle 30 include a propane compressor 31, a propane cooler/condenser 32, high-stage propane chillers 33A and 33B, an intermediate-stage propane chiller 34, and a low-stage propane chiller 35. The main components of ethylene refrigeration cycle 50 include an ethylene compressor 51, an ethylene cooler 52, a high-stage ethylene chiller 53, a low-stage ethylene chiller/condenser 55, and an ethylene economizer 56. The main components of methane refrigeration cycle 70 include a methane compressor 71, a methane cooler 72, and a methane economizer 73. The main components of expansion section 80 include a high-stage methane expansion valve and/or expander 81, a high-stage methane flash drum 82, an intermediate-stage methane expansion valve and/or expander 83, an intermediate-stage methane flash drum 84, a low-stage methane expansion valve and/or expander 85, and a low-stage methane flash drum 86. While "propane," "ethylene," and "methane" are used to refer to respective first, second, and third refrigerants, it should be understood that these are examples only, and the presently disclosed technology may involve any combination of suitable refrigerants.

Referring to FIG. 1, in one implementation, operation of the LNG facility 100 begins with the propane refrigeration cycle 30. Propane is compressed in a multi-stage (e.g., three-stage) propane compressor 31 driven by, for example, a gas turbine driver (not illustrated). The stages of compression may exist in a single unit or a plurality of separate units mechanically coupled to a single driver. Upon compression, the propane is passed through a conduit 300 to a propane cooler 32 where the propane is cooled and liquefied through indirect heat exchange with an external fluid (e.g., air or water). A portion of the stream from the propane cooler 32 can then be passed through conduits 302 and 302A to a pressure reduction system 36A, for example, an expansion valve, as illustrated in FIG. 1. At the pressure reduction system 36A, the pressure of the liquefied propane is reduced, thereby evaporating or flashing a portion of the liquefied propane. A resulting two-phase stream then flows through a conduit 304A into a high-stage propane chiller 33A, which cools the natural gas stream in indirect heat exchange 38. A high stage propane chiller 33A uses the flashed propane refrigerant to cool the incoming natural gas stream in a conduit 110. Another portion of the stream from the propane cooler 32 is routed through a conduit 302B to another pressure reduction system 36B, illustrated, for example, in FIG. 1 as an expansion valve. At the pressure reduction system 36B, the pressure of the liquefied propane is reduced in a stream 304B.

The cooled natural gas stream from the high-stage propane chiller 33A flows through a conduit 114 to a separation vessel. At the separation vessel, water and in some cases a portion of the propane and/or heavier components are removed. In some cases where removal is not completed in upstream processing, a treatment system 40 may follow the separation vessel. The treatment system 40 removes moisture, mercury and mercury compounds, particulates, and other contaminants to create a treated stream. The stream exits the treatment system 40 through a conduit 116. The stream 116 then enters the intermediate-stage propane chiller 34. At the intermediate-stage propane chiller 34, the stream is cooled in indirect heat exchange 41 via indirect heat exchange with a propane refrigerant stream. The resulting cooled stream output into a conduit 118 is routed to the low-stage propane chiller 35, where the stream can be further cooled through indirect heat exchange means 42. The resultant cooled stream exits the low-stage propane chiller 35 through a conduit 120. Subsequently, the cooled stream in the conduit 120 is routed to the high-stage ethylene chiller 53.

A vaporized propane refrigerant stream exiting the high-stage propane chillers 33A and 33B is returned to a high-stage inlet port of the propane compressor 31 through a conduit 306. An unvaporized propane refrigerant stream exits the high-stage propane chiller 33B via a conduit 308 and is flashed via a pressure reduction system 43, illustrated in FIG. 1 as an expansion valve, for example. The liquid propane refrigerant in the high-stage propane chiller 33A provides refrigeration duty for the natural gas stream. A two-phase refrigerant stream enters the intermediate-stage propane chiller 34 through a conduit 310, thereby providing coolant for the natural gas stream (in conduit 116) and the stream entering the intermediate-stage propane chiller 34 through a conduit 204. The vaporized portion of the propane refrigerant exits the intermediate-stage propane chiller 34 through a conduit 312 and enters an intermediate-stage inlet port of the propane compressor 31. The liquefied portion of the propane refrigerant exits the intermediate-stage propane chiller 34 through a conduit 314 and is passed through a pressure-reduction system 44, for example an expansion valve, whereupon the pressure of the liquefied propane refrigerant is reduced to flash or vaporize a portion of the liquefied propane. The resulting vapor-liquid refrigerant stream is routed to the low-stage propane chiller 35 through a conduit 316. At the low-stage propane chiller 35, the refrigerant stream cools the methane-rich stream and an ethylene refrigerant stream entering the low-stage propane chiller 35 through the conduits 118 and 206, respectively. The vaporized propane refrigerant stream exits the low-stage propane chiller 35 and is routed to a low-stage inlet port of the propane compressor 31 through a conduit 318. The vaporized propane refrigerant stream is compressed and recycled at the propane compressor 31 as previously described.

In one implementation, a stream of ethylene refrigerant in a conduit 202 enters the high-stage propane chiller 33B. At the high-stage propane chiller 33B, the ethylene stream is cooled through indirect heat exchange 39. The resulting cooled ethylene stream is routed in the conduit 204 from the high-stage propane chiller 33B to the intermediate-stage propane chiller 34. Upon entering the intermediate-stage propane chiller 34, the ethylene refrigerant stream may be further cooled through indirect heat exchange 45 in the intermediate-stage propane chiller 34. The resulting cooled ethylene stream exits the intermediate-stage propane chiller 34 and is routed through a conduit 206 to enter the low-stage propane chiller 35. In the low-stage propane chiller 35, the ethylene refrigerant stream is at least partially condensed, or condensed in its entirety, through indirect heat exchange 46. The resulting stream exits the low-stage propane chiller 35 through a conduit 208 and may be routed to a separation vessel 47. At the separation vessel 47, a vapor portion of the stream, if present, is removed through a conduit 210, while a liquid portion of the ethylene refrigerant stream exits the separator 47 through a conduit 212. The liquid portion of the ethylene refrigerant stream exiting the separator 47 may have a representative temperature and pressure of about −24° F. (about −31° C.) and about 285 psia (about 1,965 kPa). However, other temperatures and pressures are contemplated.

Turning now to the ethylene refrigeration cycle 50 in the LNG facility 100, in one implementation, the liquefied ethylene refrigerant stream in the conduit 212 enters an ethylene economizer 56, and the stream is further cooled by an indirect heat exchange 57 at the ethylene economizer 56. The resulting cooled liquid ethylene stream is output into a conduit 214 and routed through a pressure reduction system 58, such as an expansion valve. The pressure reduction system 58 reduces the pressure of the cooled predominantly liquid ethylene stream to flash or vaporize a portion of the stream. The cooled, two-phase stream in a conduit 215 enters the high-stage ethylene chiller 53. In the high-stage ethylene chiller 53, at least a portion of the ethylene refrigerant stream vaporizes to further cool the stream in the conduit 120 entering an indirect heat exchange 59. The vaporized and remaining liquefied ethylene refrigerant exits the high-stage ethylene chiller 53 through conduits 216 and 220, respectively. The vaporized ethylene refrigerant in the conduit 216 may re-enter the ethylene economizer 56, and the ethylene economizer 56 warms the stream through an indirect heat exchange 60 prior to entering a high-stage inlet port of the ethylene compressor 51 through a conduit 218. Ethylene is compressed in multi-stages (e.g., three-stage) at the ethylene compressor 51 driven by, for example, a gas turbine driver (not illustrated). The stages of compression may exist in a single unit or a plurality of separate units mechanically coupled to a single driver.

The cooled stream in the conduit 120 exiting the low-stage propane chiller 35 is routed to the high-stage ethylene chiller 53, where it is cooled via the indirect heat exchange 59 of the high-stage ethylene chiller 53. The remaining liquefied ethylene refrigerant exiting the high-stage ethylene chiller 53 in a conduit 220 may re-enter the ethylene economizer 56 and undergo further sub-cooling by an indirect heat exchange 61 in the ethylene economizer 56. The resulting sub-cooled refrigerant stream exits the ethylene economizer 56 through a conduit 222 and passes a pressure reduction system 62, such as an expansion valve, whereupon the pressure of the refrigerant stream is reduced to vaporize or flash a portion of the refrigerant stream. The resulting, cooled two-phase stream in a conduit 224 enters the low-stage ethylene chiller/condenser 55.

A portion of the cooled natural gas stream exiting the high-stage ethylene chiller 53 is routed through conduit a 122 to enter an indirect heat exchange 63 of the low-stage ethylene chiller/condenser 55. In the low-stage ethylene chiller/condenser 55, the cooled stream is at least partially condensed and, often, subcooled through indirect heat exchange with the ethylene refrigerant entering the low-stage ethylene chiller/condenser 55 through the conduit 224. The vaporized ethylene refrigerant exits the low-stage ethylene chiller/condenser 55 through a conduit 226, which then enters the ethylene economizer 56. In the ethylene economizer 56, vaporized ethylene refrigerant stream is warmed through an indirect heat exchange 64 prior to being fed into a low-stage inlet port of the ethylene compressor 51 through a conduit 230. As shown in FIG. 1, a stream of compressed ethylene refrigerant exits the ethylene compressor 51 through a conduit 236 and subsequently enters the ethylene cooler 52. At the ethylene cooler 52, the compressed ethylene stream is cooled through indirect heat exchange with an external fluid (e.g., water or air). The resulting cooled ethylene stream may be introduced through the conduit 202 into high-stage propane chiller 33B for additional cooling, as previously described.

The condensed and, often, sub-cooled liquid natural gas stream exiting the low-stage ethylene chiller/condenser 55 in a conduit 124 can also be referred to as a "pressurized LNG-bearing stream." This pressurized LNG-bearing stream exits the low-stage ethylene chiller/condenser 55 through the conduit 124 prior to entering a main methane economizer 73. In the main methane economizer 73, methane-rich stream in the conduit 124 may be further cooled in an indirect heat exchange 75 through indirect heat exchange with one or more methane refrigerant streams (e.g., 76, 77, 78). The cooled, pressurized LNG-bearing stream exits the main methane economizer 73 through a conduit 134 and is routed to the expansion section 80 of the methane refrigeration cycle 70. In the expansion section 80, the pressurized LNG-bearing stream first passes through a high-stage methane expansion valve or expander 81, whereupon the pressure of this stream is reduced to vaporize or flash a portion thereof. The resulting two-phase methane-rich stream in a conduit 136 enters into a high-stage methane flash drum 82. In the high-stage methane flash drum 82, the vapor and liquid portions of the reduced-pressure stream are separated. The vapor portion of the reduced-pressure stream (also called the high-stage flash gas) exits the high-stage methane flash drum 82 through a conduit 138 and enters into the main methane economizer 73. At the main methane economizer 73, at least a portion of the high-stage flash gas is heated through the indirect heat exchange means 76 of the main methane economizer 73. The resulting warmed vapor stream exits the main methane economizer 73 through the conduit 138 and is routed to a high-stage inlet port of the methane compressor 71, as shown in FIG. 1.

The liquid portion of the reduced-pressure stream exits the high-stage methane flash drum 82 through a conduit 142 and re-enters the main methane economizer 73. The main methane economizer 73 cools the liquid stream through indirect heat exchange 74 of the main methane economizer 73. The resulting cooled stream exits the main methane economizer 73 through a conduit 144 and is routed to a second expansion stage, illustrated in FIG. 1 as intermediate-stage expansion valve 83 and/or expander, as an example. The intermediate-stage expansion valve 83 further reduces the pressure of the cooled methane stream, which reduces a temperature of the stream by vaporizing or flashing a portion of the stream. The resulting two-phase methane-rich stream output in a conduit 146 enters an intermediate-stage methane flash drum 84. Liquid and vapor portions of the stream are separated in the intermediate-stage flash drum 84 and output through conduits 148 and 150, respectively. The vapor portion (also called the intermediate-stage flash gas) in the conduit 150 re-enters the methane economizer 73, wherein the vapor portion is heated through an indirect heat exchange 77 of the main methane economizer 73. The resulting warmed stream is routed through a conduit 154 to the intermediate-stage inlet port of methane compressor 71.

The liquid stream exiting the intermediate-stage methane flash drum 84 through the conduit 148 passes through a low-stage expansion valve 85 and/or expander, whereupon the pressure of the liquefied methane-rich stream is further reduced to vaporize or flash a portion of the stream. The resulting cooled two-phase stream is output in a conduit 156 and enters a low-stage methane flash drum 86, which separates the vapor and liquid phases. The liquid stream exiting the low-stage methane flash drum 86 through a conduit 158 comprises the liquefied natural gas (LNG) product at near atmospheric pressure. This LNG product may be routed downstream for subsequent storage, transportation, and/or use.

A vapor stream exiting the low-stage methane flash drum 86 (also called the low-stage methane flash gas) in a conduit 160 is routed to the methane economizer 73. The methane economizer 73 warms the low-stage methane flash gas through an indirect heat exchange 78 of the main methane economizer 73. The resulting stream exits the methane economizer 73 through a conduit 164. The stream is then routed to a low-stage inlet port of the methane compressor 71.

The methane compressor 71 comprises one or more compression stages. In one implementation, the methane compressor 71 comprises three compression stages in a single module. In another implementation, one or more of the compression modules are separate but mechanically coupled to a common driver. Generally, one or more intercoolers (not shown) are provided between subsequent compression stages.

As shown in FIG. 1, a compressed methane refrigerant stream exiting the methane compressor 71 is discharged into a conduit 166. The compressed methane refrigerant is routed to the methane cooler 72, and the stream is cooled through indirect heat exchange with an external fluid (e.g., air or water) in the methane cooler 72. The resulting cooled methane refrigerant stream exits the methane cooler 72 through a conduit 112 and is directed to and further cooled in the propane refrigeration cycle 30. Upon cooling in the propane refrigeration cycle 30 through a heat exchanger 37, the methane refrigerant stream is discharged into s conduit 130 and subsequently routed to the main methane economizer 73, and the stream is further cooled through indirect heat exchange 79. The resulting sub-cooled stream exits the main methane economizer 73 through a conduit 168 and then combined with the stream in the conduit 122 exiting the high-stage ethylene chiller 53 prior to entering the low-stage ethylene chiller/condenser 55, as previously discussed.

In some cases, the feed to the LNG facility 100 contains heavy hydrocarbon material which precipitates and collects in the high-stage ethylene chiller 53. In one implementation, a hydrocarbon solvent is injected into the process to eliminate or otherwise reduce such fouling. However, introducing a hydrocarbon solvent into the LNG facility 100 may affect various logistics and standardized measures associated with the LNG facility 100. As such, to minimize a quantity of imported solvent in the LNG facility 100, a solvent recovery unit (SRU) may be deployed between debutanizers and condensate tanks of the train that balances a minimization of solvent import into the LNG facility 100 with a quantity of solvent sufficient to curtail heavy hydrocarbon deposition in the high-stage ethylene chiller 53. For example, the solvent may be injected into the process at approximately 15 gpm per train.

Solvent recovery may be maximum when a quantity of solvent imported over time is minimum. More particularly, a maximum amount of imported solvent occurs when inventorying the process, while the SRU minimizes the solvent losses into the process. The imported solvent composition is similar to that of the solvent recovered in the SRU, so the amount of imported solvent during initial inventory is minimized. Further, the composition of the recovered solvent is such that the solvent is contained within a closed circuit, thereby minimizing losses. In one implementation, the SRU includes a two-tower system with various ancillary components, including, but not limited to one or more pumps, reflux drums, condensers, reboilers, and/or the like. A drum may be deployed upstream of the high-stage ethylene chiller 53. Solvent losses may occur overhead of a heavies removal column, a vapor to methane system from a heavies removal column heavies reflux drum, and condensate product, among other points. Further, some material in the recovered solvent may be introduced via the feed to the LNG facility 100. Thus, solvent import may be minimized over time when: the SRU recovered solvent composition resembles the imported solvent composition; solvent losses are minimized in the process; and a high amount of solvent material is contained in the feed to the LNG facility 100.

Turning to FIG. 2, an example LNG production system 400 with dry gas solvent injection is shown. The LNG production system 400 may be deployed in the LNG facility 100, for example to curtail heavy hydrocarbon deposition in the high-stage ethylene chiller 53. In one implementation, the LNG production system 400 includes a solvent injection point where solvent is injection into a train liquefaction area. The solvent injection point may be located, for example, upstream of intermediate-stage propane-ethylene feed chillers, upstream of low-stage propane-ethylene feed chillers, and/or the like. In one implementation, the solvent may be stored in a solvent tank, which provides a feed of solvent to a pump. A control valve regulates a flow of the solvent to an injection system at the solvent injection point that disperses the solvent into the natural gas flowing therethrough. The injection system may include a hydraulic nozzle, an atomizing nozzle, and/or the like to disperse the solvent into the natural gas feed. Once the solvent is injected into the feed gas at the solvent injection point, the gas and liquid mix, thereby vaporizing the solvent. Full vaporization and uniform distribution of the solvent into a slow-flowing feed of gas condenses heavy components contained in the vapor phase as the feed gas is chilled in the propane exchangers.

The injection system provides small dispersed droplets of solvent within the feed gas, providing adequate mixing straight run length and residence time prior to encountering an elbow or other flow direction change downstream of the solvent injection point. For example, where the injection system does not involve atomization of the solvent, approximately 10-20 lengths of straight run piping downstream of the solvent injection point and a first encountered elbow may be provided. Further, residence time between the solvent injection point and the first encountered elbow may be approximately 0.5 seconds or more. Moreover, the control valve may control a flow of the solvent at the solvent injection point to maintain an installed gain value between approximately 0.5 and 2.0. In one implementation, the mixture of the solvent injected into the feed of gas is directed through low-stage propane-ethylene feed chillers 402, and the resulting chilled feed is then directed into a drum 404.

In one implementation, the liquid formed through the injection of the solvent into the feed of gas, contains very heavy components that are capable of fouling a high-stage ethylene chiller 406. The liquid containing the very heavy components are removed using the injected solvent in the drum 404 disposed upstream of the high-stage ethylene chiller 406. Vapor resulting from the drum 404 is directed to the high-stage ethylene chiller 406, and liquid bypasses the high-stage ethylene chiller 406. The liquid bypassing the high-stage ethylene chiller 406 may be sent to a heavies removal column 408.

A remainder of heavy components contained in the vapor directed from the drum 404 to the high-stage ethylene chiller 406 that are non-fouling are removed using the heavies removal column 408. Combined material from the heavies removal column 408 bottoms and the drum 404 is directed to a debutanizer 410. Material from the debutanizer 410 bottoms is directed to and processed with an SRU 412. In some cases, the SRU 412 may process material from a plurality of trains. A heavies reflux drum 418 may direct liquid from the debutanizer 410 to reflux the heavies removal column 408.

The debutanizer 410 of each train may be operated, for example, at a pressure of approximately 325 psig with an overhead temperature of approximately 105° F. and a bottoms temperature of approximately 380° F. The bottom from each train debutanizer 410 may be collected in a header and sent to a depentanizer feed drum, providing a surge volume to dampen fluctuations taking place at any train to create a steady feed into a condensate stabilizer 414. A second such tower may also be utilized. In one implementation, vapor and liquid from the depentanizer feed drum are directed into a depentanizer. At the depentanizer, a tight separation is made between C5 and lighter components and C6 and heavier components. For example, the depentanizer may include an air-cooled partial condenser and a hot oil reboiler to separate the components. Liquid from the depentanizer reflux drum may be equal to or less than 100 ppmv of C6 and heavier components to ensure that vapor sent to the methane system is clean, thus avoiding freezing issues in the corresponding liquefaction area. In one implementation, the depentanizer has an operating pressure of approximately 35 psig, a condensing temperature of approximately 115° F., and a bottoms temperature of approximately 260° F., which varies depending on solvent recovery (e.g., minimum to maximum) and solvent quality (e.g., straight run naphtha to heavy naphtha).

In one implementation, vapor from the depentanizer reflux drum is sent to the methane refrigeration system of each train under pressure control. Meanwhile, liquid from the depentanizer reflux drum is used to reflux the depentanizer using depentanizer reflux pumps. Any excess liquid, which is mainly comprised of butanes and pentanes, is sent to either the fuel system or a liquefaction area of each train via depentanizer overhead pumps. The depentanizer bottoms is effectively a condensate product out of which solvent is distilled, and the depentanizer bottoms may be pumped using depentanizer bottoms pumps to a condensate splitter column. In this column, a solvent material of a composition that is recyclable into the process is obtained. The column may include an operating pressure of approximately 20 psig with a total condensing in overhead system resulting in a condensed liquid temperature of approximately 215° F. to 220° F. The column may have a bottoms temperature ranging from approximately 350° F. to 360° F., varying depending on solvent recovery (e.g., minimum to maximum) and solvent quality (e.g., straight run naphtha to heavy naphtha). The depentanizer bottoms may be fed into a top tray of the condensate splitter column, thereby ensuring proper liquid/vapor traffic within the tower. Vapor from the condensate splitter column may be completely condensed with air and directed to a condensate splitter reflux drum. Liquid from the condensate splitter reflux drum may be used to reflex the depentanizer using condensate splitter reflux pumps.

In one implementation, the generated solvent is pumped to a solvent receiving facility 420 via solvent pumps with any excess liquid directed to condensate storage 416. Since condensate material is hot, an air-cooled heat exchanger may be disposed upstream of the solvent pups before the material is sent to the solvent receiving facility 420 or the condensate storage 416. The condensate splitter column bottoms may be the main condensate product, which is cooled and pumped to storage via a condensate air-cooled exchanger and condensate pumps. In one implementation, C6 and C7 components are directed into the solvent receiving facility 420, and C8 and heavier components are directed into the condensate storage 416. Recovered solvent may be directed to the solvent injection point and combined with the feed into the low-stage propane-ethylene feed chillers 402.

Thus, as can be understood from FIG. 2, a central SRU is deployed between the debutanizer(s) of the train and the condensate tanks. The SRU includes a two-tower system with ancillary components, including, but not limited to, one or more pumps, reflux drums, condensers, reboilers, and/or the like. After an initial recovery of an imported solvent into the process, the SRU produces a solvent that is recycled into the process and mixed with the process gas. Upon mixing and chilling, the solvent condenses along with the heavy-fouling components, which are collectively directed to the heavies removal unit. From the heavies removal unit, the solvent, along with the condensate product, is directed to the SRU, thereby completing the cycle. It will be appreciated by those skilled in the art that the process may be completed with or without solvent recovery. The LNG production system 400 therefore generally provides a solvent to eliminate or otherwise reduce fouling of the high-stage ethylene chiller, while minimizing the import of the solvent into the process.

Figure 3:
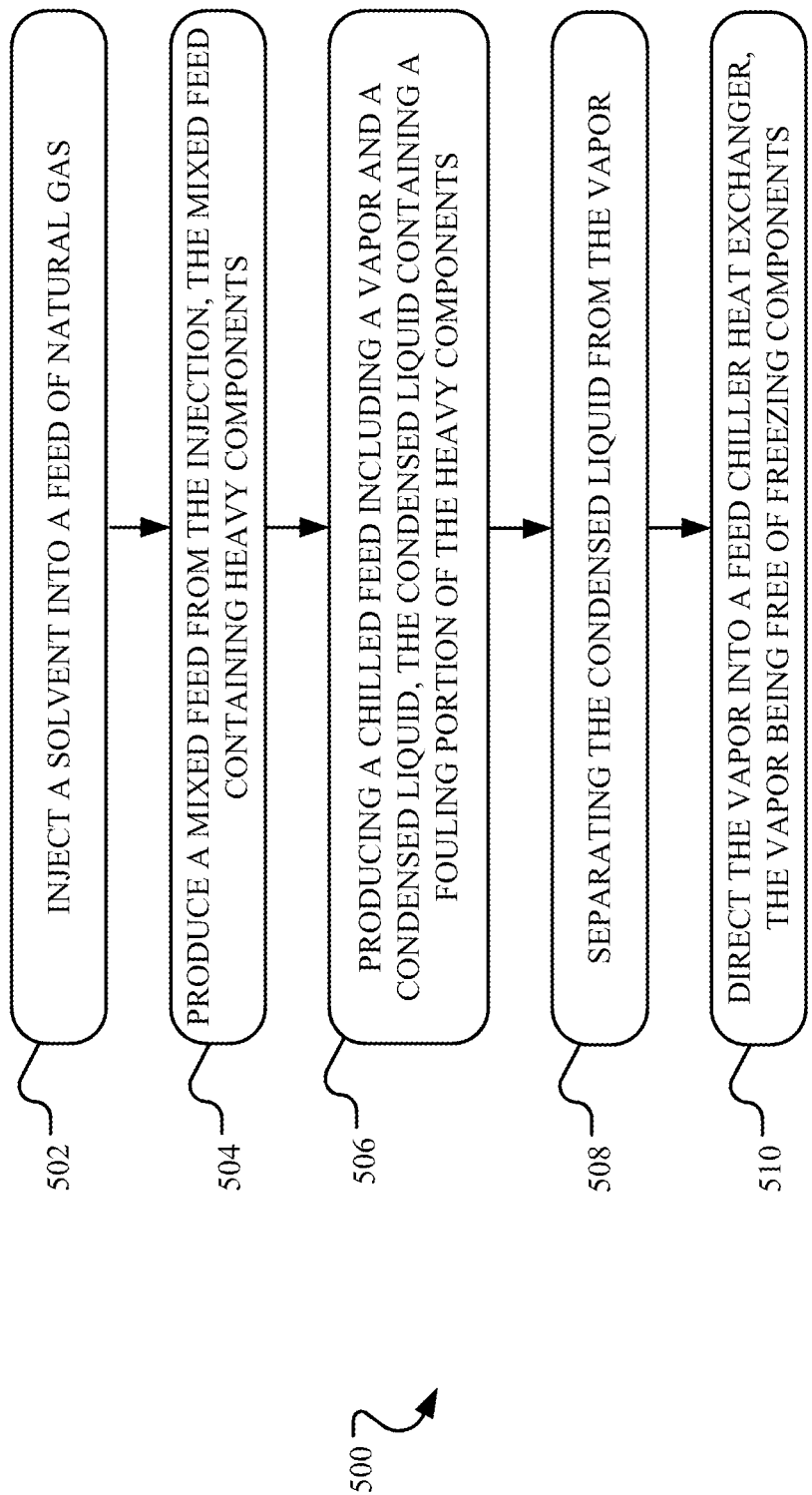
FIG. 3 illustrates example operations for solvent injection.

Referring to FIG. 3, example operations 500 for solvent injection are illustrated. In one implementation, an operation 502 injects a solvent into a feed of natural gas at a solvent injection point, and an operation 504 produces a mixed feed from a dispersal of the solvent into the feed of natural gas. The mixed feed contains heavy components, a portion of which may be components that freeze, thereby causing fouling at one or more areas in an LNG facility.

An operation 506 produces a chilled feed by chilling the mixed feed. The chilled feed includes a vapor and a condensed liquid. The condensed liquid is formed by the solvent condensing a fouling portion of the heavy components during chilling. The fouling portion includes components that cause the fouling in the LNG facility through freezing. An operation 508 separates the liquid containing the fouling portion from the vapor. Following the separation of the operation 508, an operation 510 directs the vapor into a feed chiller heat exchanger. The vapor directed into the feed chiller heat exchanger is free of freezing components, thereby reducing fouling of the feed chiller heat exchanger.

Figure 4:
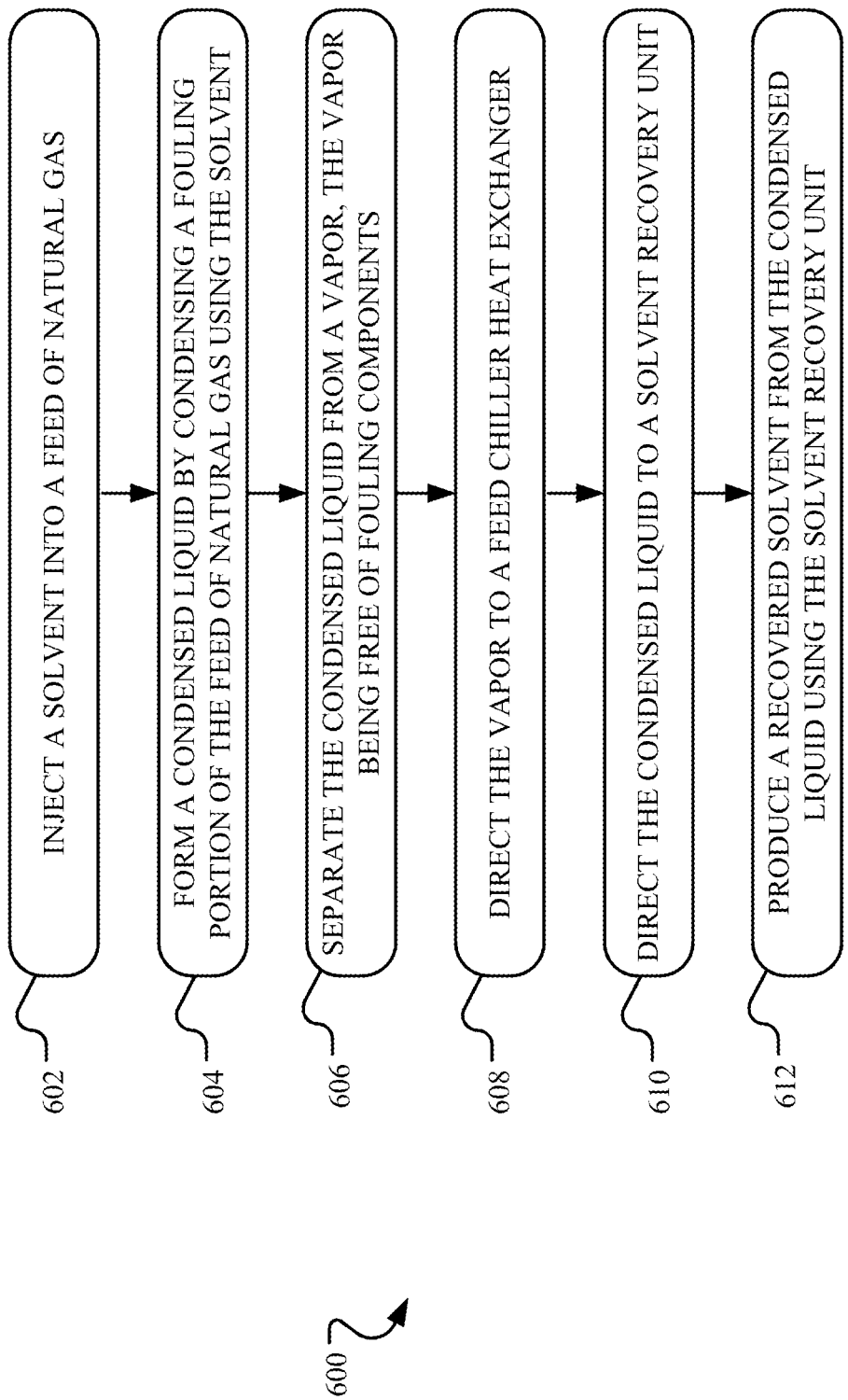
FIG. 4 illustrates example operations for dry gas solvent injection and recovery.

Turning next to FIG. 4, example operations 600 for dry gas solvent injection and recovery are illustrated. In one implementation, an operation 602 injects a solvent into a feed of natural gas at a solvent injection point, and an operation 604 forms a condensed liquid by condensing a fouling portion of the feed of natural gas using the solvent. An operation 606 separates the condensed liquid from a vapor of the feed of natural gas. The vapor is free of fouling components. An operation 608 directs the vapor to a feed chiller heat exchanger, and an operation 610 directs the condensed liquid to a solvent recovery unit. An operation 612 produces a recovered solvent from the condensed liquid using the solvent recovery unit.

Figure 5:
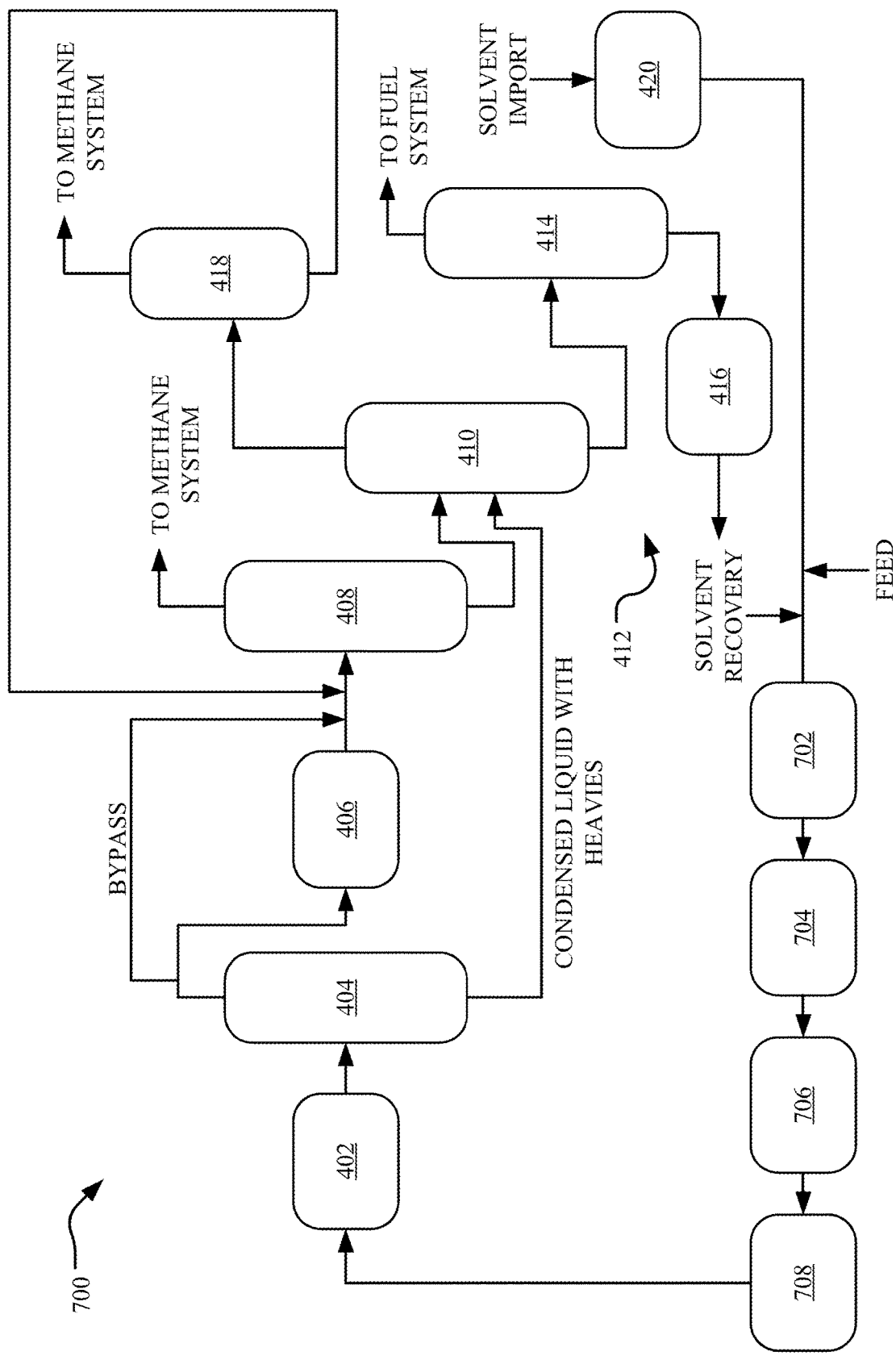
FIG. 5 shows an example LNG production system with wet gas solvent injection.

FIG. 5 shows an example LNG production system 700 with wet gas solvent injection. The LNG production system 700 may be similar to the LNG production system 400 including components and systems (e.g., components and/or systems 402-420) and associated methodology that is substantially the same or similar to those described with respect to FIG. 2.

In one implementation, a composition of the feed is altered by injecting an external solvent into the process, as described herein. The feed is injected upstream of a high-stage propane feed chiller 702 and directed through a heater 706 disposed between a dryer inlet filter coalescer 704 and a molecular sieve dehydrator 708. The heater 706 may address any hydrocarbon condensation that occurs within the dryer inlet filter coalescer 704. Any moisture and mercury present in the solvent is treated in the molecular sieve dehydrator 708, which may include or operate in conjunction with a mercury removal bed. As such, the solvent is combined with the feed upstream of the high-stage propane feed chiller 702, the solvent is thoroughly combined with gas as the mixture flows through the low-stage propane-ethylene feed chillers 402 before entering the drum 404. As before, at the drum 404, condensed liquid containing the freezing components is directed to the debutanizer 410, and the vapor output from the drum 404, which is free of freezing components, is directed to the high-stage ethylene chiller 406, as described herein. It will be appreciated by those skilled in the art that the process may be completed with or without solvent recovery. Further, the LNG production system 700 may provide the potential for higher C4 and C5 recovery.

Figure 6:
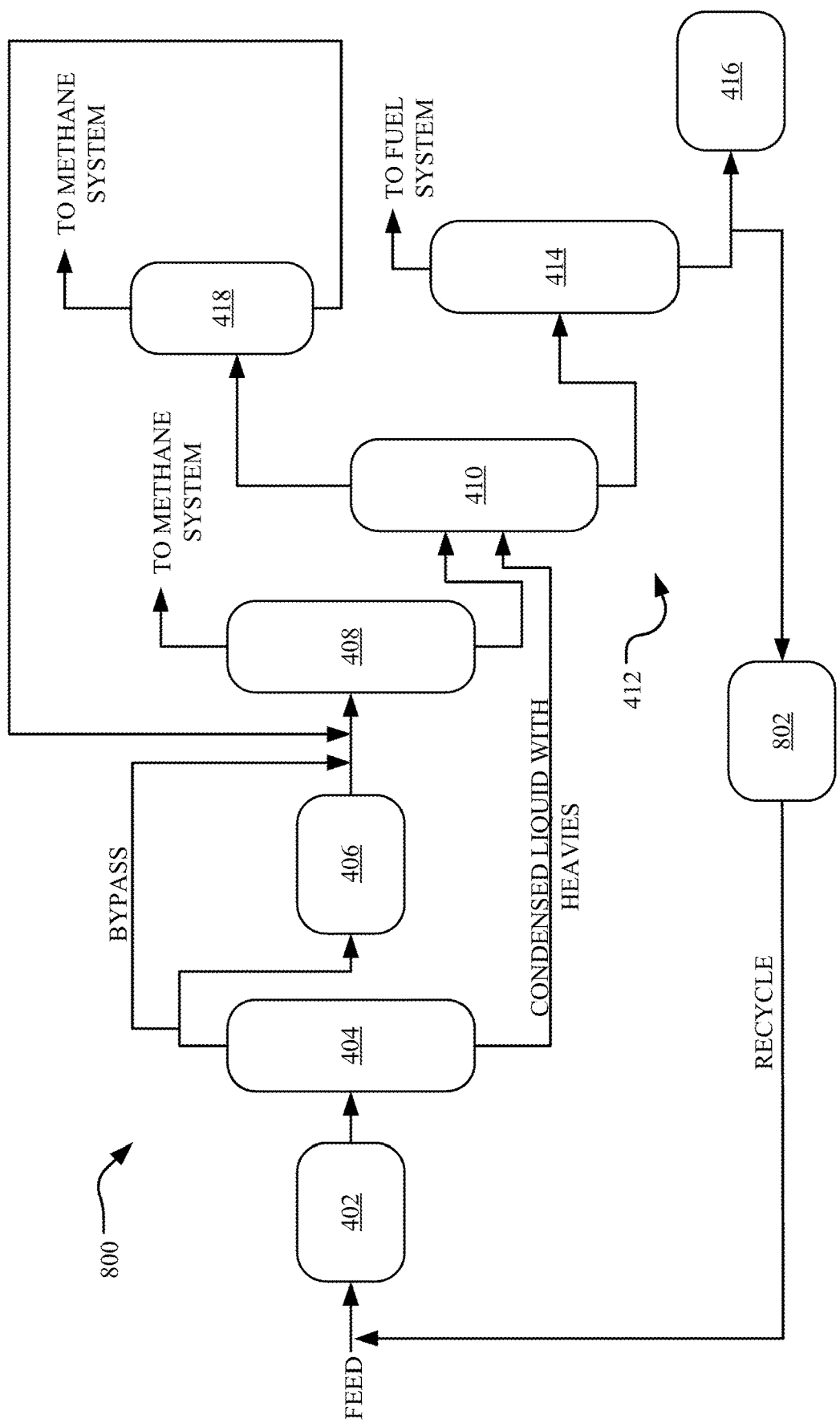
FIG. 6 illustrates an example LNG production system with a bottoms recycling system.

FIG. 6 illustrates an example LNG production system 800 with a bottoms recycling system. The LNG production system 800 may be similar to the LNG production system 400 including components and systems (e.g., components and/or systems 402-420) and associated methodology that is substantially the same or similar to those described with respect to FIG. 2.

In one implementation, a composition of the feed is modified by introducing an internal recirculation loop (recycle) in which liquid from the debutanizer 410 bottoms is pumped into the low-stage propane-ethylene feed chillers 402 inlet using a recycler 802, which may include one or more pumps and/or an air cooler exchanger. The air cooler exchanger of the recycler 802 cools the pumped liquid from the debutanizer 410 bottoms to match a temperature of the gas stream being directed into the low-stage propane-ethylene feed chillers 402. The combined feed and recycle are chilled in the low-stage propane-ethylene feed chillers 402 and directed into the drum 404, wherein the condensed liquid containing the freezing components is directed to the debutanizer 410. The vapor from the drum 404, which is free of freezing components, is directed to the high-stage ethylene chiller 406, as described herein.

Figure 7:
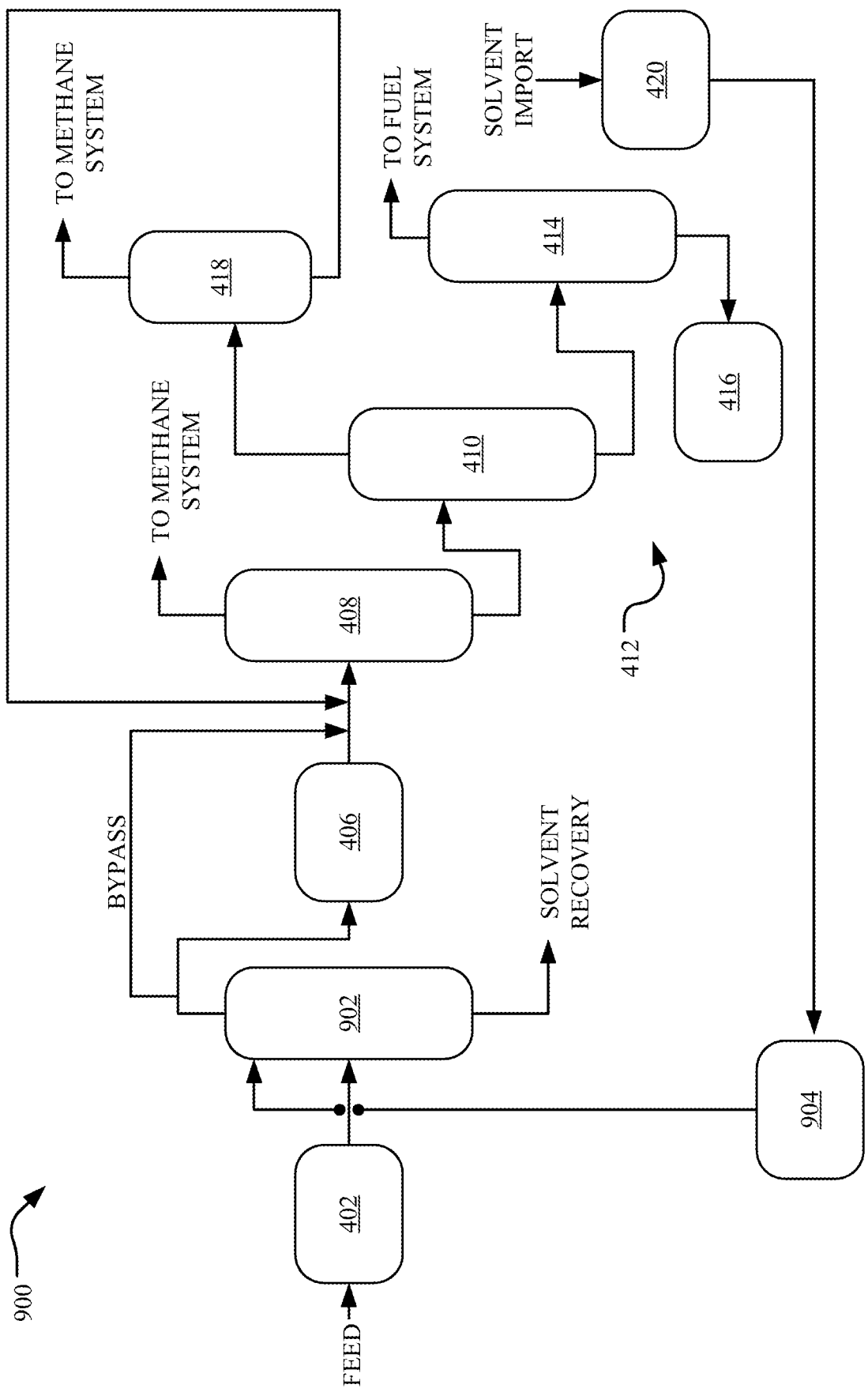
FIG. 7 depicts an example LNG production system with an upstream dry gas solvent absorption column.

Referring to FIG. 7, an example LNG production system 900 with an upstream dry gas solvent absorption column is depicted. The LNG production system 900 may be similar to the LNG production system 400 including components and systems (e.g., components and/or systems 402-420) and associated methodology that is substantially the same or similar to those described with respect to FIG. 2.

In one implementation, feed gas containing freezing components is contacted with a solvent in an absorber tower 902, which provides a physical absorption process. During the physical absorption process within the absorber tower 902, unwanted components in the gas are absorbed into liquid phase because the solubility is higher in the liquid phase than in the gas phase. The imported solvent, after treatment, is pumped and chilled (e.g., using propane refrigerant) using heat exchanger(s) 904 before being directed to the absorber tower. In one implementation, within the absorber tower 902, the lean solvent flows downwards and contacts the upwardly flowing feed gas containing the freezing components. As the solvent flows down, it progressively absorbs the freezing components. The rich solvent is drawn from the absorber tower 902 bottoms to be regenerated, thereby reducing import. Resulting gas, free of freezing components is directed to the high-stage ethylene chiller 406, as described herein.

Figure 8:
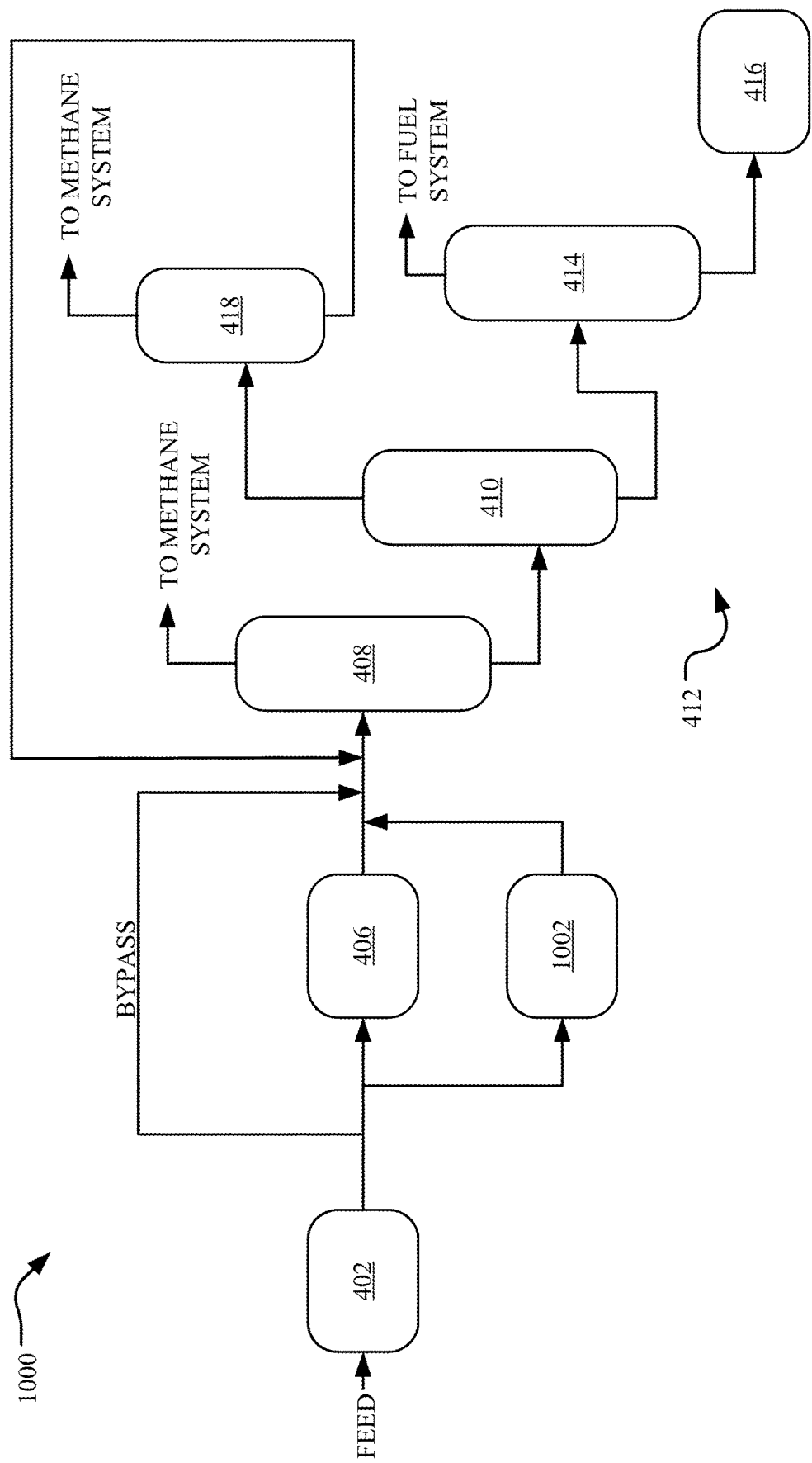
FIG. 8 shows an example LNG production system with one or more spare ethylene feed chiller heat exchangers having valving for defrosting.

As can be understood from FIG. 8, an example LNG production system 1000 may include one or more spare ethylene feed chiller heat exchangers 1002 having valving for defrosting. The LNG production system 1000 may be similar to the LNG production system 400 including components and systems (e.g., components and/or systems 402-420) and associated methodology that is substantially the same or similar to those described with respect to FIG. 2.

In one implementation, the spare ethylene feed chiller heat exchanger(s) 1002 are deployed in parallel to the high-stage ethylene chiller 406 and include isolating and online defrost connections. The spare ethylene feed chiller heat exchanger(s) 1002 may be identical to or otherwise similar to high-stage ethylene chiller 406 in configuration and/or operation. A set of shell and tube exchangers (e.g., 406 and 1002) may be used to reduce a rate of fouling. For example, one of these exchangers may be in operation while the other remains in standby mode. Additionally, a plurality of exchangers may be used. For example, four smaller units may be deployed in parallel to replace the high-stage ethylene chiller 406, with two exchangers in operation and the other two in standby mode until switching.

Figure 9:
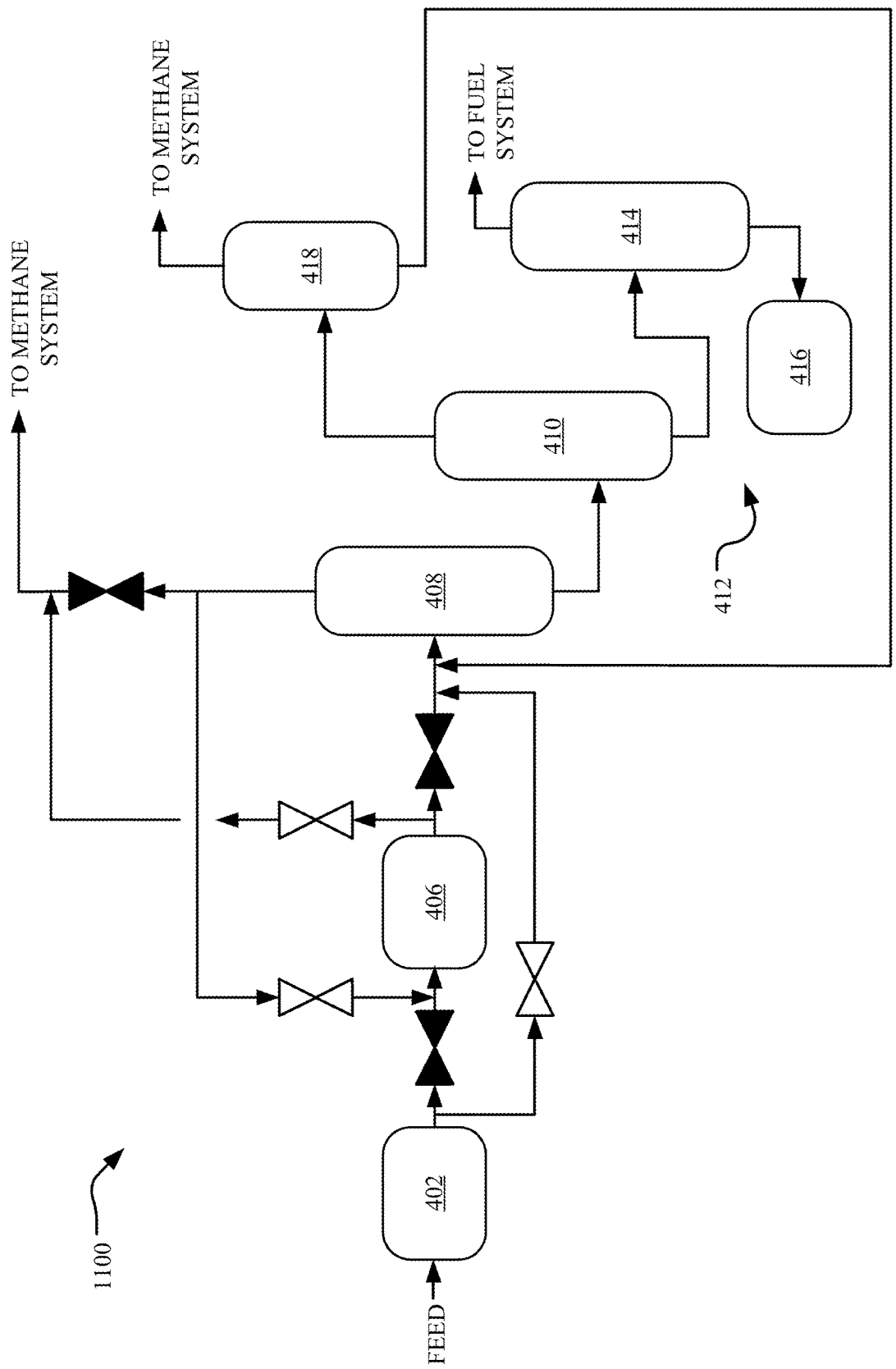
FIG. 9 illustrates an example LNG production system with piping from an ethylene feed chiller heat exchanger to downstream of a heavies removal unit.

Finally, FIG. 9 illustrates an example LNG production system 1100 with piping from the high-stage ethylene chiller 406 to downstream of the heavies removal column 408. The LNG production system 1100 may be similar to the LNG production system 400 including components and systems (e.g., components and/or systems 402-420) and associated methodology that is substantially the same or similar to those described with respect to FIG. 2.

It will be appreciated that the various example LNG production systems 400 and 700-1100 are exemplary only and other systems or modifications to these systems may be used to eliminate or otherwise reduce fouling in the high-stage ethylene chiller 406 in accordance with the presently disclosed technology.

It is understood that the specific order or hierarchy of steps in the methods disclosed are instances of example approaches and can be rearranged while remaining within the disclosed subject matter. The accompanying method claims thus present elements of the various steps in a sample order, and are not necessarily meant to be limited to the specific order or hierarchy presented.

While the present disclosure has been described with reference to various implementations, it will be understood that these implementations are illustrative and that the scope of the present disclosure is not limited to them. Many variations, modifications, additions, and improvements are possible. More generally, implementations in accordance with the present disclosure have been described in the context of particular implementations. Functionality may be separated or combined in blocks differently in various implementations of the disclosure or described with different terminology. These and other variations, modifications, additions, and improvements may fall within the scope of the disclosure as defined in the claims that follow.

What is claimed is:

1. A method for reducing fouling in a liquefied natural gas (LNG) facility, the method comprising:
   injecting a solvent into a feed of natural gas at a solvent injection point to produce a mixed feed containing heavy components;
   chilling the mixed feed to produce a chilled feed including a condensed liquid, the condensed liquid containing a fouling portion of the heavy components;
   receiving, by one or more debutanizers, the condensed liquid, the one or more debutanizers being disposed upstream from a solvent recovery unit (SRU);
   directing the condensed liquid to the SRU;
   outputting, by the SRU, a recovered solvent; and
   directing the recovered solvent to the solvent injection point to combine the recovered solvent with the feed.

2. The method of claim 1, wherein the solvent is a hydrocarbon solvent.

3. The method of claim 1, wherein the solvent injection point is disposed upstream of one or more feed chillers.

4. The method of claim 1, wherein the SRU is a two tower system.

5. The method of claim 1, prior to directing the recovered solvent to the solvent injection point, further comprising:
   directing the recovered solvent to a recycler; and
   cooling, via the recycler, the recovered solvent.

6. The method of claim 5, wherein the recycler includes one or more of a pump and an air cooler exchanger, the air cooler exchanger cooling the recovered solvent.

7. The method of claim 5, wherein the recovered solvent is cooled to correspond with a temperature of the feed.

8. The method of claim 1, wherein the chilled feed includes a vapor.

9. The method of claim 8 further comprising:
   separating, via a drum, the condensed liquid containing the fouling portion of the heavy components from the vapor.

10. A system for reducing fouling in a liquefied natural gas (LNG) facility, the system comprising:
    an injection system injecting a solvent into a feed of natural gas at a solvent injection point, a dispersal of the solvent into the feed of natural gas producing a mixed feed containing heavy components;
    a chiller chilling the mixed feed to produce a chilled feed, the chilled feed including a condensed liquid, and the condensed liquid containing a fouling portion of the heavy components;
    one or more debutanizers receiving the condensed liquid;
    a solvent recovery unit (SRU) receiving the condensed liquid from the one or more debutanizers and outputting a recovered solvent, the recovered solvent configured to be directed to the solvent injection point to combine the recovered solvent with the feed, and the one or more debutanizers disposed upstream the SRU.

11. The system of claim 10, wherein the solvent is a hydrocarbon solvent.

12. The system of claim 10, wherein the chiller is a low-stage propane-ethylene chiller.

13. The system of claim 10, wherein the SRU includes two towers.

14. The system of claim 10 further comprising:
    a recycler receiving and cooling the recovered solvent prior to the recovered solvent being directed to the solvent injection point.

15. The system of claim 14, wherein the recycler includes one or more of a pump and an air cooler exchanger, the air cooler exchanger cooling the recovered solvent.

16. The system of claim 14, wherein the recovered solvent is cooled to correspond with a temperature of the feed.

17. The system of claim 10, wherein the chilled feed includes a vapor.

18. The system of claim 17 further comprising:
    a drum separating the condensed liquid containing the fouling portion of the heavy components from the vapor.

* * * * *